United States Patent
Baric et al.

(10) Patent No.: US 11,584,371 B2
(45) Date of Patent: Feb. 21, 2023

(54) SYSTEMS AND METHODS FOR USING R-FUNCTIONS AND SEMI-ANALYTIC GEOMETRY FOR LANE KEEPING IN TRAJECTORY PLANNING

(71) Applicant: Toyota Research Institute, Inc., Los Altos, CA (US)

(72) Inventors: Miroslav Baric, San Jose, CA (US); Jin Ge, Santa Clara, CA (US); Timothee Cazenave, Santa Clara, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 309 days.

(21) Appl. No.: 16/929,785

(22) Filed: Jul. 15, 2020

(65) Prior Publication Data
US 2022/0017086 A1 Jan. 20, 2022

(51) Int. Cl.
*B60W 30/12* (2020.01)
*G06T 7/73* (2017.01)
*B60W 60/00* (2020.01)
*G06V 20/56* (2022.01)

(52) U.S. Cl.
CPC .......... *B60W 30/12* (2013.01); *B60W 60/001* (2020.02); *G06T 7/74* (2017.01); *G06V 20/588* (2022.01); *G06T 2207/20021* (2013.01); *G06T 2207/30241* (2013.01); *G06T 2207/30256* (2013.01)

(58) Field of Classification Search
CPC ....... B60W 30/12; B60W 60/001; G06T 7/74; G06T 2207/20021; G06T 2207/30241; G06T 2207/30256; G06V 20/588

USPC ......................................................... 701/25
See application file for complete search history.

(56) References Cited

U.S. PATENT DOCUMENTS

| 7,765,066 B2 | 7/2010 | Braeuchle et al. |
| 8,219,298 B2 | 7/2012 | Nishira et al. |
| 8,411,900 B2 | 4/2013 | Naka et al. |
| 9,898,005 B2 | 2/2018 | Mei et al. |

(Continued)

FOREIGN PATENT DOCUMENTS

DE 102008027590 A1 * 1/2009 .......... B60T 8/17558

OTHER PUBLICATIONS

Wikipedia article, "Rvachev Function", found at: "https://en.wikipedia.org/w/index.php?title=Rvachev_function&oldid=749266337" (2016).

(Continued)

*Primary Examiner* — Elaine Gort
*Assistant Examiner* — Matthias S Weisfeld
(74) *Attorney, Agent, or Firm* — Christopher G. Darrow; Darrow Mustafa PC

(57) ABSTRACT

System, methods, and other embodiments described herein relate to lane keeping in a vehicle. In one embodiment, a method includes determining lane boundaries according to at least the sensor data and a map. The method includes defining a reference system over a lane defined by the lane boundaries. The method includes evaluating vehicle boundary points within the reference system as a cost in optimizing a trajectory of the vehicle and using an R-function that defines geometric relationships between the vehicle boundary points and the reference system. The method includes providing an indicator about the trajectory to control the vehicle.

17 Claims, 4 Drawing Sheets

(56) References Cited

U.S. PATENT DOCUMENTS

| | | | |
|---|---|---|---|
| 10,012,984 B2 | | 7/2018 | Berntorp et al. |
| 10,496,090 B2 | * | 12/2019 | Latotzki ............ B60W 60/0053 |
| 2007/0164852 A1 | | 7/2007 | Litkouhi |
| 2009/0296987 A1 | | 12/2009 | Kageyama et al. |
| 2013/0103618 A1 | | 4/2013 | Urmanov et al. |
| 2014/0257659 A1 | * | 9/2014 | Dariush ................. G08G 1/166 |
| | | | 701/1 |
| 2017/0305421 A1 | | 10/2017 | Sekizawa et al. |
| 2018/0170378 A1 | * | 6/2018 | Oka ........................ G08G 1/167 |
| 2019/0079520 A1 | | 3/2019 | Meyer et al. |
| 2019/0102632 A1 | | 4/2019 | Tsuchiya et al. |
| 2019/0147253 A1 | | 5/2019 | Bai et al. |
| 2019/0266418 A1 | * | 8/2019 | Xu ......................... G05D 1/0221 |
| 2019/0291728 A1 | | 9/2019 | Shalev-Shwartz et al. |
| 2019/0391583 A1 | | 12/2019 | Ning et al. |
| 2020/0209860 A1 | * | 7/2020 | Zhang .................. G06N 3/0454 |
| 2021/0003683 A1 | * | 1/2021 | Chen ....................... G01S 17/89 |

OTHER PUBLICATIONS

Baheri et al. "Vision-based Autonomous Driving A model Learning Approach", found at: arXiv:2003.08300v1 [eess.SY] Mar. 18, 2020.
Nguyen et al., "Shared Lateral Control with On-Line Adaptation of the Automation Degree for Driver Steering Assist System: A Weighting Design Approach", 2015 54th IEEE Conference on Decision and Control (CDC), Dec. 2015, Osaka, France, pp. 857-862.
Innocenti et al., "Imitation Learning for Vision-based Lane Keeping Assistance", found at: arXiv:1709.03853v1 [cs.LG] Sep. 12, 2017.

* cited by examiner

SYSTEMS AND METHODS FOR USING R-FUNCTIONS AND SEMI-ANALYTIC GEOMETRY FOR LANE KEEPING IN TRAJECTORY PLANNING

TECHNICAL FIELD

The subject matter described herein relates, in general, to systems and methods for lane keeping, and, more particularly, to using an analytic approach in combination with geometry of the roadway to improve lane keeping within the context of optimization-based trajectory planning.

BACKGROUND

Vehicles may be equipped with many sensors that allow the vehicles to perceive other vehicles, obstacles, pedestrians, and other features of a surrounding environment. Using information from the noted sensors permits the vehicle to perform various automated or autonomous tasks that may function to broadly improve safety (e.g., collision avoidance, lane keeping, etc.) or wholly control the vehicle in place of a driver.

However, routines that process the sensor information and provide for deriving determinations on which the noted improved functionality rests can suffer from difficulties in being overly complex and thus computationally intensive. As such, tradeoffs between accuracy and computational load may be necessary, thereby resulting in systems that are less robust. Consequently, accurately and efficiently generating determinations for such functions as lane keeping presents many difficulties.

SUMMARY

In one embodiment, example systems, and methods relate to an improved approach to performing lane keeping in a vehicle. For example, in one arrangement, a lane keeping system is disclosed that employs the use of R-functions to produce an analytic penalty/cost associated with crossing a geometric lane boundary, thereby improving the accuracy and efficiency for determining trajectories that remain within a lane. In general, the lane keeping system initially identifies lane boundaries for a vehicle by, for example, acquiring sensor data about a surrounding environment and deriving the lane boundaries therefrom. In further aspects, the lane keeping system may also leverage map data, such as mappings of roads, including lane-level information. In any case, the lane keeping system can approximate the lane boundaries using a piecewise linear approximation (e.g., multiple linear segments to approximate lane boundaries that curve). From the approximation of the lane boundaries, the lane keeping system may then define a reference system over the lane by, for example, dividing the lane into polygons to form separate subregions between the boundaries.

As such, the lane keeping system may then evaluate locations of vehicle boundary points (e.g., the four corners of the vehicle) in relation to the polygons in order to assess whether the vehicle is maintaining a lane. In particular, in one or more arrangements, the lane keeping system performs the evaluation as part of trajectory optimization for determining a trajectory. The trajectory is, in general, a path for the vehicle to follow when using autonomous controls or semi-autonomous controls to safely navigate the environment. That is, for example, the lane keeping system may be integrated along with or in parallel to a trajectory optimization module that generates optimal trajectories for controlling the vehicle or at least assisting in the control of the vehicle.

The trajectory optimization module functions to, in one or more approaches, iteratively consider multiple different trajectories for the vehicle to follow out to a temporal horizon (e.g., several seconds). The trajectories may provide separate control profiles and/or account for various aspects of the environment in different ways. To assess the desirability of the separate trajectories, the module may impose one or more constraints or costs. As such, the lane keeping module may evaluate a cost/constraint associated with each trajectory for lane keeping according to the reference system, as noted above. For example, the lane keeping system may implement an R-function to assess an inequality that relates vehicle boundary points to the reference system (i.e., the grid of polygons defining the lane) for each separate trajectory. When no trajectory corresponds to the vehicle remaining within the lane, then the lane keeping system, for example, induces control of the vehicle to perform an emergency maneuver. When a trajectory is identified that does maintain the vehicle in the lane, then the lane keeping system may provide the trajectory to control the path of the vehicle. In this way, the lane keeping system improves the assessments for lane keeping by using a more efficient approach that is integrated with the trajectory optimization.

In one embodiment, a lane keeping system for lane keeping in a vehicle is disclosed. The lane keeping system includes one or more processors and a memory communicably coupled to the one or more processors. The memory stores a sensor module including instructions that when executed by the one or more processors, cause the one or more processors, to determine lane boundaries according to at least the sensor data and a map. The sensor module includes instructions to define a reference system over a lane defined by the lane boundaries. The memory stores an analysis module including instructions that when executed by the one or more processors cause the one or more processors to evaluate vehicle boundary points within the reference system as a cost in optimizing a trajectory of the vehicle and using an R-function that defines geometric relationships between the vehicle boundary points and the reference system. The analysis module includes instructions to provide an indicator about the trajectory to control the vehicle.

In one embodiment, a non-transitory computer-readable medium for lane keeping in a vehicle and including instructions that, when executed by one or more processors, cause the one or more processors to perform various functions is disclosed. The instructions include instructions to determine lane boundaries according to at least the sensor data and a map. The instructions include instructions to define a reference system over a lane defined by the lane boundaries. The instructions include instructions to evaluate vehicle boundary points within the reference system as a cost in optimizing a trajectory of the vehicle and using an R-function that defines geometric relationships between the vehicle boundary points and the reference system. The instructions include instructions to provide an indicator about the trajectory to control the vehicle.

In one embodiment, a method for lane keeping in a vehicle is disclosed. In one embodiment, the method includes determining lane boundaries according to at least the sensor data and a map. The method includes defining a reference system over a lane defined by the lane boundaries. The method includes evaluating vehicle boundary points within the reference system as a cost in optimizing a trajectory of the vehicle and using an R-function that defines geometric relationships between the vehicle boundary points and the reference system. The method includes providing an indicator about the trajectory to control the vehicle.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
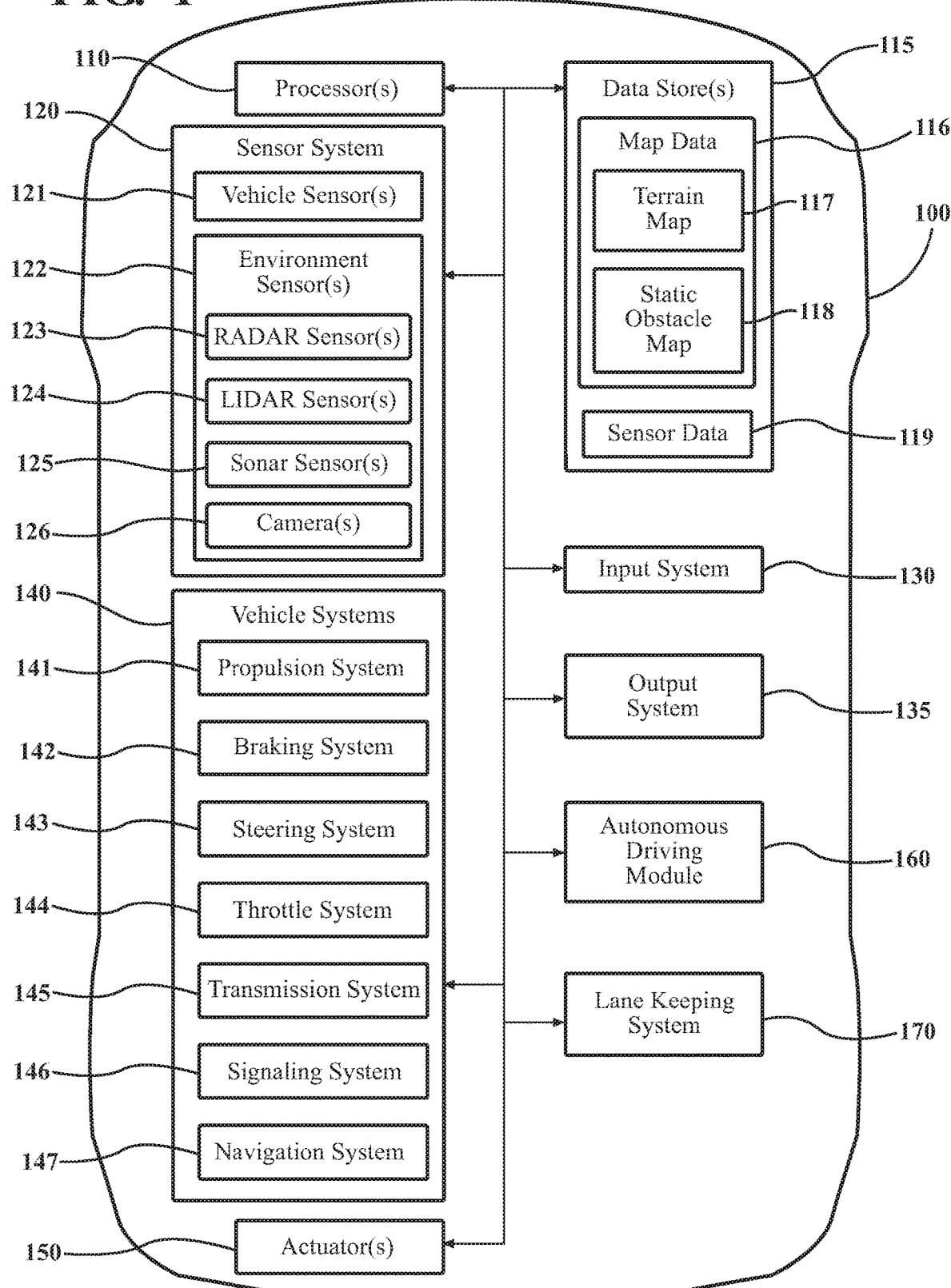
FIG. 1 illustrates one embodiment of a vehicle within which systems and methods disclosed herein may be implemented.

Systems, methods, and other embodiments associated with an improved approach to performing lane keeping in a vehicle are disclosed herein. As previously noted, perceiving aspects of the surrounding environment and efficiently deriving determinations from the perceptions can represent a difficulty. That is, various considerations associated with acquiring and processing sensor data may result in overly complex solutions that are computationally intensive. When this occurs, results may not be available within acceptable timeframes, thereby resulting in reduced performance.

Therefore, in one embodiment, a lane keeping system employs the use of R-functions to produce an analytic penalty/cost associated with crossing a geometric lane boundary, thereby improving the accuracy and efficiency for determining trajectories that remain within a lane. "R" is, in one or more arrangements, a form in which functional elements can be defined for computation via a computing system. "R" provides a mechanism for defining the functions and interfaces between components. Because of the particular way in which the system defines "R," implementing various functions is simpler and more computationally feasible. Additionally, "R" is extensible. Therefore, the noted R-function that is based on "R," as will be defined explicitly in subsequent sections of this disclosure, provide improved computational efficiency for constraining and/or determining costs of a trajectory to stay within a lane.

In general, the lane keeping system facilitates the use of the R-function for lane keeping by initially identifying and defining boundaries of a lane. For example, the lane keeping system, in one approach, identifies lane boundaries for a vehicle by acquiring sensor data about a surrounding environment and deriving the lane boundaries therefrom. In further aspects, the lane keeping system may also leverage map data, such as mappings of roads, including lane-level information. Thus, the lane keeping system can use this information to approximate the lane boundaries according to, in one approach, a piecewise linear approximation (e.g., multiple linear segments to approximate lane boundaries that curve). From the approximation of the lane boundaries the lane keeping system may then define a reference system over the lane by, for example, dividing the lane into polygons to form separate subregions that define the lane.

As such, the lane keeping system may then evaluate locations of vehicle boundary points (e.g., the four corners of the vehicle) in relation to the polygons in order to assess whether the vehicle is maintaining a lane. In particular, in one or more arrangements, the lane keeping system performs the evaluation as part of trajectory optimization for determining a trajectory. The trajectory is, in general, a path for the vehicle to follow when using autonomous controls or semi-autonomous controls to safely navigate the environment. That is, for example, the lane keeping system may be integrated along with or in parallel to a trajectory optimization module that generates optimal trajectories for controlling the vehicle or at least assisting in the control of the vehicle.

The trajectory optimization module functions to, in one or more approaches, iteratively optimize a trajectory and may further consider multiple different trajectories for the vehicle to follow out to a temporal horizon (e.g., several seconds). The trajectories may provide separate control profiles and/or account for various aspects of the environment in different ways. To assess the desirability of one or more separate trajectories, the module may impose one or more constraints or costs. As such, the lane keeping module may evaluate a cost/constraint associated with each trajectory for lane keeping according to the reference system, as noted above. For example, the lane keeping system may implement the R-function to assess an inequality that relates vehicle boundary points to the reference system (i.e., the grid of polygons defining the lane) for each separate trajectory. The lane keeping system may evaluate the separate trajectories using the R-function to provide an indication about whether a particular trajectory maintains the vehicle within the lane. It should be appreciated that the use of the described R-function may take different roles depending on the implementation. For example, the lane keeping system may use the R-function as a mechanism for validating a trajectory. That is, the lane keeping system uses the R-function to evaluate whether a particular trajectory maintains the vehicle within the boundaries of the lane when, for example, the trajectory is provided as an option for controlling the vehicle. In a further aspect, instead of relying on the R-function as a final validation test for the trajectory, the lane keeping system integrates the use of the R-function into a trajectory optimizer. Thus, in this case, the lane keeping system iteratively generates values for a trajectory as the trajectory is being optimized as a cost/constraint on the optimization to facilitate the optimizer deriving an optimal trajectory that remains within the lane.

As one example of how the lane keeping system may integrate the use of the R-function into optimization-based trajectory planning, consider the following. Motion planning for an autonomous vehicle may include computing a sequence of waypoints $\{w_i\}$, i=0, . . . , N that define a path that an actual physical vehicle can follow. Waypoint vectors may include Cartesian coordinates, heading angle (orientation), and velocity and acceleration. If the waypoint time evolution is governed by some dynamics equations, the waypoints are referred to as state vectors or states. The waypoints $w_i$ are associated with a time instance $t_i$. Time instances range from initial time to $t_0$ the prediction horizon $t_N$. The sequence of waypoints associated to time instances $\{w_i(t_i)\}$, $i=0, \ldots, N$ is referred to as, in at least one approach, a trajectory. Accordingly, optimization-based motion planning is formulated, in a generic discrete-time form, as:

$$\min_{u_0, u_{N-1}} l_N(W_N(t_N)) + \sum_{i=0}^{N-1} l_i(w_i, u_i) \quad \text{(i)}$$

$$\text{Subject to: } w_{i+1} = f(w_i, u_i), \quad \text{(ii)}$$

$$(w_i, u_i) \in c_i, i = 0, \ldots, N-1 \quad \text{(iii)}$$

$$w_N \in c_N \quad \text{(iv)}$$

Where: (i) represents the cost function that is being optimized (e.g., minimized) by a selection of control inputs $\{u_i\}$, (ii) represents dynamic equations derived from the vehicle dynamics model, that define how the control inputs affect the evolution of waypoints (states), and (iii)-(iv) define constraints on waypoints (states) and on control variables. The lane keeping system in cooperation with a trajectory optimizer may solve the above problem in an iterative approach. The solution, if one exists, is a (locally) optimal trajectory $\{w_i^*\}$. The advantage of optimization-based planning with states, control inputs and dynamics constraints (ii-iv) is that the optimal trajectory $\{w_i^*\}$ approximately respects vehicle dynamics and constraints. As such, the optimal trajectory can be followed by the vehicle resulting in increased ride comfort and safety.

One requirement for a trajectory may be that the vehicle stays within a lane. The system can impose this constraint in the planning of the optimization (i) either as a cost term (penalty) $l_i$, or as constraints on waypoints and control variables. In order to efficiently solve the problem by gradient-based numerical optimization procedures in real-time during autonomous driving, the lane keeping cost term or constraint should be differentiable almost everywhere, and efficient to compute. Therefore, the R-functions described herein provide for these improvements to enable the approach.

In any case, the lane keeping system in conjunction with the optimizer produces trajectories and provides determinations about the trajectories as either a final evaluation and/or as part of the iterative optimization-based generation of the trajectory. When no trajectory corresponds to the vehicle remaining within the lane, then the lane keeping system, for example, induces control of the vehicle to perform an emergency maneuver. When a trajectory is identified that does maintain the vehicle in the lane, then the lane keeping system may provide the trajectory to control the path of the vehicle. In this way, the lane keeping system improves the assessments for lane keeping by using a more efficient approach that is integrated with the trajectory optimization.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any electronic device that is associated with transportation and that, for example, is to maintain a trajectory within a lane or assist another device with maintaining such a trajectory.

In any case, the vehicle 100, as described herein, also includes various elements. It will be understood that, in various embodiments, it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are illustrated as being located within the vehicle 100, it will be understood that one or more of these elements can be located external to the vehicle 100. Further, the elements shown may be physically separated by large distances and provided as remote services (e.g., cloud-computing services, software-as-a-service (SaaS), distributed computing service, etc.).

Some of the possible elements of the vehicle 100 are shown in FIG. 1 and will be described along with subsequent figures. However, a description of many of the elements in FIG. 1 will be provided after the discussion of FIGS. 2-4 for purposes of the brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the vehicle 100 includes a lane keeping system 170 that functions to efficiently determine the correspondence of a trajectory and a lane of travel for the vehicle 100 in order to provide for lane keeping functionality. Moreover, while depicted as a standalone component, in one or more embodiments, the lane keeping system 170 is integrated with the autonomous driving module 160, the camera 126, or another component of the vehicle 100. The noted functions and methods will become more apparent with a further discussion of the figures.

Figure 2:
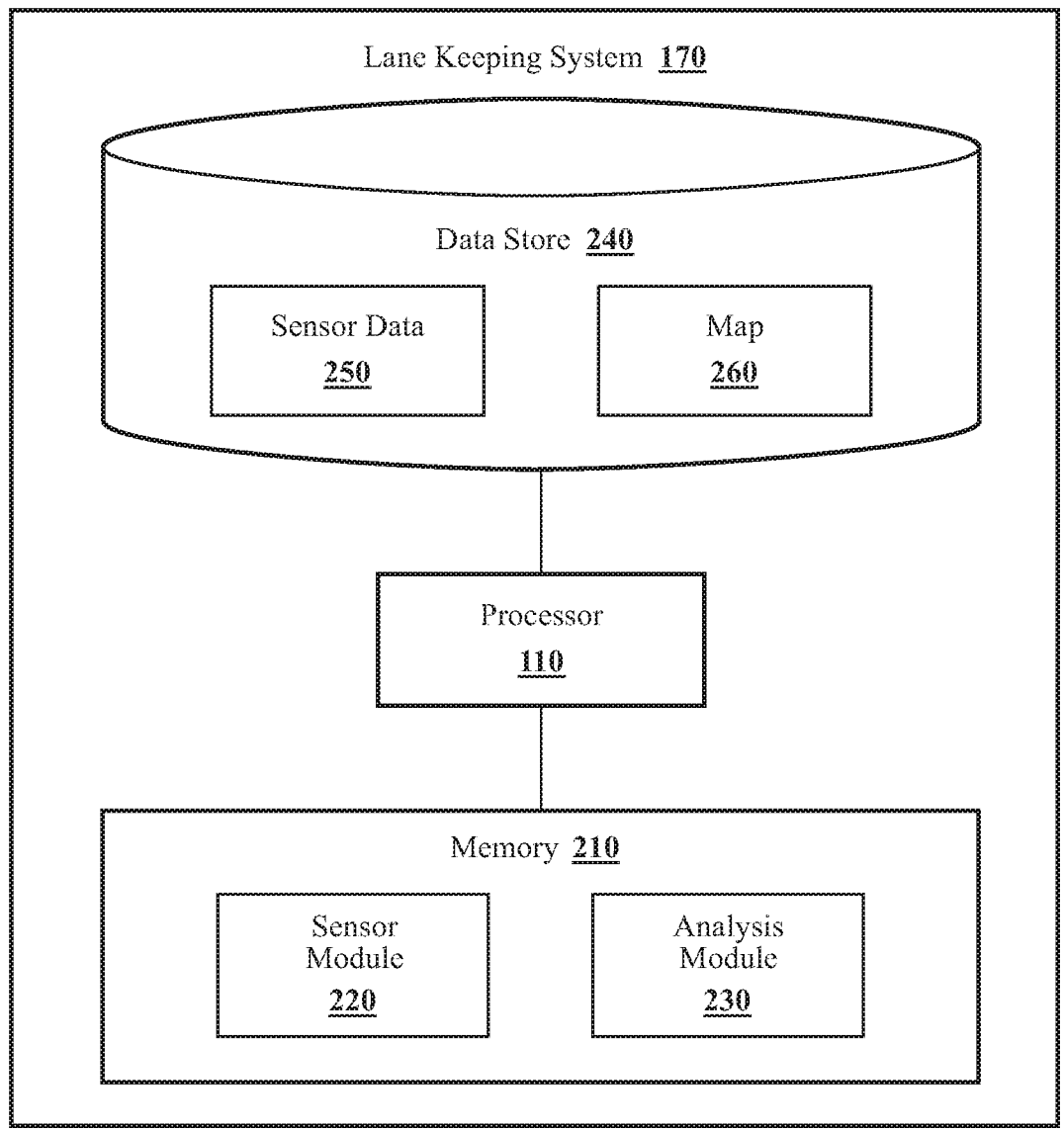
FIG. 2 illustrates one embodiment of a lane keeping system that is associated with improving lane keeping in a vehicle using R-functions.

With reference to FIG. 2, one embodiment of the lane keeping system 170 is further illustrated. The lane keeping system 170 is shown as including a processor 110. Accordingly, the processor 110 may be a part of the lane keeping system 170 or the lane keeping system 170 may access the processor 110 through a data bus or another communication path. In one or more embodiments, the processor 110 is an application-specific integrated circuit (ASIC) that is configured to implement functions associated with a sensor module 220 and an analysis module 230. In general, the processor 110 is an electronic processor such as a microprocessor that is capable of performing various functions as described herein. While illustrated as a local resource, in various embodiments, the processor 110 may be a cloud-based resource that is remote from the system 170. In one embodiment, the lane keeping system 170 includes a memory 210 that stores the sensor module 220 and the analysis module 230. The memory 210 is a random-access memory (RAM), read-only memory (ROM), a hard disk drive, a flash memory, or other suitable memory for storing the modules 220 and 230. The modules 220 and 230 are, for example, computer-readable instructions that, when executed by the processor 110, cause the processor 110 to perform the various functions disclosed herein.

Furthermore, in one embodiment, the lane keeping system 170 includes a data store 240. The data store 240 is, in one embodiment, an electronic data structure such as a database that is stored in the memory 210 or another memory and that is configured with routines that can be executed by the processor 110 for analyzing stored data, providing stored data, organizing stored data, and so on. Thus, in one embodiment, the data store 240 stores data used by the modules 220 and 230 in executing various functions. In one embodiment, the data store 240 includes sensor data 250, and map data 260, along with, for example, other information that is used by the modules 220 and 230.

With continued reference to FIG. 2, the sensor module 220 generally includes instructions that function to control the processor 110 to acquire data inputs from one or more sensors of the vehicle 100. The inputs are, in one embodiment, observations of one or more objects in an environment proximate to the vehicle 100 and/or other aspects about the surroundings. As provided for herein, the sensor module 220, in one embodiment, acquires sensor data 250 that includes at least observations of boundaries of a lane in which the vehicle 100 is traveling. Thus, the observations may identify aspects of the lane, such as lane markers in varying forms, including solid lines, dashed lines, unmarked road edges, curbs, and so on. The sensor data 250 is, in one embodiment, images of a forward direction of the vehicle 100 that captures the lane boundaries. In further arrangements, the tracking module 220 acquires the sensor data 250 from further sensors such as a radar, a light detection and ranging (LiDAR), and/or other sensors as may be suitable for identifying attributes about the lane.

Accordingly, the sensor module 220, in one embodiment, controls the respective sensors to provide the data inputs in the form of the sensor data 250. Additionally, while the sensor module 220 is discussed as controlling the various sensors to provide the sensor data 250, in one or more embodiments, the sensor module 220 can employ other techniques to acquire the sensor data 250 that are either active or passive. For example, the sensor module 220 can passively sniff the sensor data 250 from a stream of electronic information provided by the various sensors to further components within the vehicle 100. Moreover, the sensor module 220 can undertake various approaches to fuse data from multiple sensors when providing the sensor data 250 and/or from sensor data acquired over a wireless communication link. Thus, the sensor data 250, in one embodiment, represents a combination of perceptions acquired from multiple sensors.

In one or more approaches, the sensor module 220 may further integrate information from the map 260 into determinations about lane boundaries. That is, beyond using the sensor data 250 to identify lane boundaries, the sensor module 220 may further fuse data from the map 260 that serves as prior knowledge about the lanes when identifying the lane boundaries. For example, the sensor module 220 may use the sensor data 250 in combination with lane information from the map 260 to provide an improved confidence in determinations about locations of the lane boundaries in the surrounding environment of the vehicle 100. Thus, the sensor module 220 may fuse the sensor data 250 or determinations therefrom with information from the map 260 to identify the lane boundaries and approximate locations of the lane boundaries. Moreover, while the map 260 is shown as a discrete element within the lane keeping system 170, in one or more arrangements, the map 260 is part of or derived from map data 116. In further aspects, the map 260 may be part of or derived from information within the navigation system 147. In any case, the sensor module 220 can use various sources of data to determine boundaries of a lane in which the vehicle 100 is traveling.

Accordingly, the sensor module 220 includes instructions to cause the processor 110 to, in one or more arrangements, determine lane boundaries according to at least the sensor data and a map. That is, from the general identification of the lane boundaries, the sensor module 220 may further approximate the lane boundaries in a piecewise manner using, for example, line segments. As one example, consider FIG. 3, which illustrates one example of a roadway 300 on which the vehicle 100 is traveling. The sensor module 220 identifies boundaries of a lane in which the vehicle 100 is traveling and approximates the boundaries using a piecewise set of line segments as shown for boundary 310 and boundary 320. In general, using the piecewise approximation simplifies the representation of the lane and thereby also simplifies subsequent determinations about the vehicle 100 in relation to the lane. Thus, this aggregation of line segments generally approximates curvatures of the roadway 300 in such a way that the piecewise-linear segments fully contain the original lane.

Figure 3:
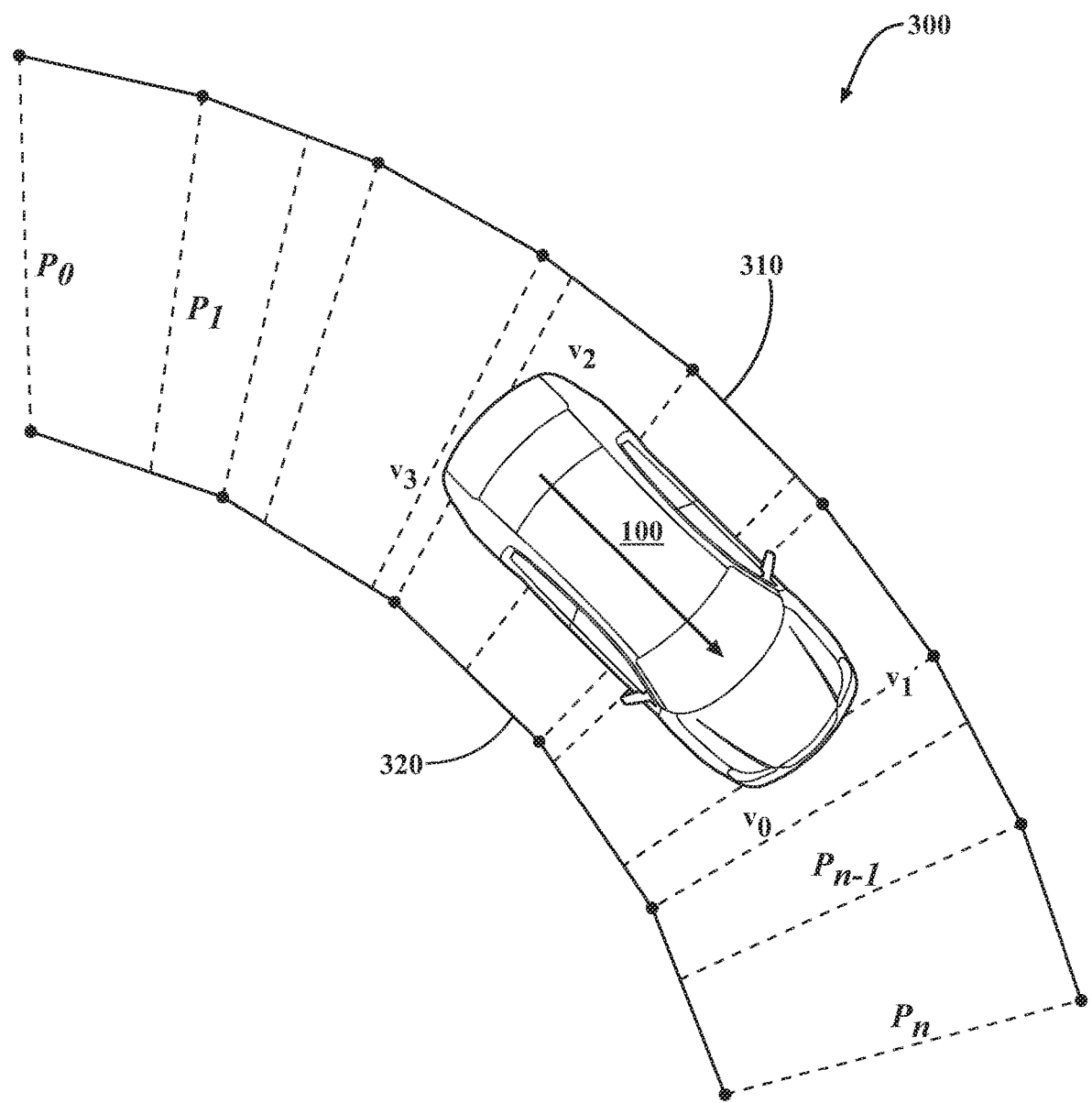
FIG. 3 is a diagram illustrating one example of a reference system over a lane and an associated vehicle.

The sensor module 220 then proceeds to, in one or more embodiments, define a reference system over the lane. For example, in one approach, the sensor module 220 divides the lane between the approximated boundaries into disjoint polygons. The sensor module 220, as shown in FIG. 3, can draw lines that segment the lane between the boundaries 310 and 320. In one approach, the sensor module 220 draws the lines to be perpendicular with one of the segments while extending toward the other lane boundary. In general, the sensor module 220 may initiate a segment to divide the lane from separate nodes between segments. In further aspects, the sensor module 220 may add further nodes within separate boundary line segments to provide a finer granularity of polygons that divide the lane. In yet further aspects, the sensor module 220 segments the lane by subdividing into polygons using nodes of the piecewise lane boundaries, or, alternatively, by creating additional nodes along each boundary by matching relative arclength of the opposing boundary.

In any case, the sensor module 220 divides the lane into disjoint polygons that are represented in FIG. 3 as $P_0$, $P_1$, $P_{n-1}$, $P_n$. It should be appreciated that while the present disclosure generally discusses the sensor module 220 as dividing the lane into disjoint polygons, in further approaches, the sensor module 220 may divide the lane into a grid (symmetrical or asymmetrical) or according to another geometric form. In any case, the sensor module 220 divides the lane in order to form a reference system by which the lane keeping system 170 can then assess trajectories of the vehicle 100.

Continuing with FIG. 2, the analysis module 230 includes instructions that when executed by the one or more processors cause the one or more processors to evaluate vehicle boundary points of the vehicle 100 to determine whether the vehicle is within a boundary. While the discussion broadly mentions evaluating whether the vehicle is within a lane, it should be appreciated that the analysis module 230 may evaluate a future location of the vehicle 100 according to a planned or potential trajectory. In still further aspects, the analysis module 230 evaluates whether the vehicle 100 is within a lane at a future point (i.e., at a prediction horizon) according to multiple different trajectories.

That is, for example, the lane keeping system 170, in one or more approaches, operates in conjunction with a trajectory optimizer to provide a cost or constraint associated with the vehicle 100 maintaining a current lane of travel. For example, the lane keeping system 170 uses the R-function to iteratively generate the cost/constraint as the trajectory optimizer is developing an optimal trajectory. The lane keeping system 170 generates the cost/constraint at, for example, each iteration of the trajectory by the trajectory optimizer in order to specify whether the trajectory remains within the lane. Once the trajectory optimizer produces the final optimal trajectory, the lane keeping system 170 may also provide a validation assessment of whether the optimal trajectory remains within the lane by generating the cost/constraint using the R-function.

In a further aspect, the trajectory optimizer may instantiate a plurality of separate processes to generate a plurality of different trajectories for the vehicle 100 to potentially follow over a prediction horizon (e.g., 2 seconds into the future). The different trajectories may account for different control patterns or other aspects of the vehicle 100 and/or the surrounding environment. As part of selecting a trajectory by which the lane keeping system 170 and/or an autonomous driving module 160 controls the vehicle 100, the analysis module 230 and/or the trajectory optimizer evaluate the trajectories over multiple iterations to determine optimal trajectories for the different parameters for controlling the vehicle 100. Thus, the analysis module 230 evaluates the trajectories at, for example, multiple iterations of optimization to determine whether the trajectories maintain the vehicle 100 within the lane.

In one approach, the analysis module 230 determines whether the vehicle 100 is within the lane over the prospective trajectories according to an R-function as expressed in relation to vehicle boundary points. The vehicle boundary points, which are denoted as $v_n$ herein, are, in one or more approaches, outermost corner points of the vehicle 100. As shown in FIG. 3, the corner points $v_0$, $v_1$, $v_2$, and $v_3$ are outer corner points of the vehicle 100. In further embodiments, the analysis module 230 may define the vehicle boundary points to include different points and/or a different number of points. For example, in one approach, the analysis module 230 defines the vehicle boundary points at the wheels of the vehicle 100 along an axle of the vehicle 100 or as otherwise preferred in order to actively track placement of the vehicle 100 within the lane.

To evaluate the relationship of the vehicle 100 with the lane, the analysis module 230 determines the pose (i.e., orientation) of the vehicle in the lane according to the trajectory at the defined point of the prediction horizon and then evaluates the R-function as defined subsequently. In a further approach, the analysis module 230 evaluates the position of the vehicle 100 along the trajectory at multiple different steps out to the prediction horizon (e.g., every 0.5 s). In any case, the analysis module 230 implements the R-function as follows to define a geometric relationship between the vehicle boundary points and the reference system that is over the lane.

Equation (1) represents a general association for a profile of the vehicle 100, as represented by the vehicle boundary points in FIG. 3 to be within the polygons defined by the reference system.

$$v_i = \bigcup_{k=0}^{n} P_k \qquad (1)$$

The analysis module 230 may represent the polygons ($P_k$) as a set of inequalities as shown in Equation (2)

$$P_k = \{x : g^k - H^k x \geq 0\} \qquad (2)$$

The condition shown in Equation (2) may be further represented by a set of equivalent logic conditions, as shown in Equation (3).

$$\bigvee_{k=0}^{n} \min\{g^k - H^k v_i\} \geq 0 \qquad (3)$$

In Equation (3), the analysis module 230 implements the min function to take a minimum of vector coefficients. Additionally, denoting the min as $f_k(x) := \{g^k - H^k v_i\}$ provides for the analysis module 230 recursively computing Equation (3) using the R-function represented by Equation (4), below.

$$f_k(v_i) \vee \geq 0 \vee f_{k+1}(v_i) \geq 0 \equiv \qquad (4)$$
$$\frac{1}{1+\alpha}\left(f_k(v_i) + f_{k+1}(v_i) + \sqrt{f_k^2(v_i) + f_{k+1}^2(v_i) - 2\alpha f_k(v_i) f_{k+1}(v_i)}\right) \geq 0$$

Thus, the analysis module 230 computes inequality (3) via the R-function of Equation (4) for each of the separate vehicle boundary points ($v_i$) over the trajectory (i.e., at each separate point along the trajectory to identify whether the vehicle boundary points remain within the lane). The analysis module 230 evaluates the R-function by using the R-function as a cost or constraint on the determination of the trajectory, thereby functioning to further facilitate optimization of the trajectory over multiple iterations and/or to provide a final indication of whether the trajectory maintains the vehicle within the lane. In one or more approaches, the analysis module 230 evaluates the R-function by generating a maximal residual ($f_k$) for separate polygons within the reference system associated with the separate vehicle boundary points. The analysis module 230 may then further compute a cumulative value of separate points along the trajectory using Equation (4). In one or more aspects, the analysis module 230 also generates a gradient from the prior separate evaluations and provides the gradient to the trajectory optimizer for use by the optimizer in producing a subsequent iteration of the trajectory. In a further aspect, the analysis module 230 determines separate minimums for the vehicle boundary points over, for example, all determinations for the R-function. The provided resulting value for the particular associated trajectory indicates whether the vehicle 100 maintains the lane over the trajectory. For example, in one or more arrangements, a positive result for the value indicates that the trajectory maintains the vehicle 100 within the lane whereas a negative value indicates the trajectory would cause the vehicle 100 to leave the lane. While the above discussion generally references a single trajectory, it should be appreciated that the lane keeping system 170, in one or more arrangements, functions in combination with a trajectory optimizer to iteratively optimize the trajectory and may also consider many different trajectories, and, thus, provides indicators about whether the separate trajectories maintain the vehicle 100 within a current lane of travel.

The analysis module 230 may further provide an indicator about the resulting determination for a trajectory. That is, the analysis module 230 may provide the indicator about a current/projected trajectory of the vehicle 100 to control the vehicle 100, to notify a driver of the vehicle 100, and so on. In further aspects, the analysis module 230 provides the indicator as a control signal to the trajectory optimizer and/or the autonomous driving module 160 to cause the vehicle 100 to use an associated trajectory to control a path of the vehicle 100. In one or more arrangements, the analysis module 230 provides the indicator to cause the vehicle 100 to handover autonomous control of the vehicle 100 a driver, and/or to execute an emergency maneuver (e.g., steering to maintain a lane, collision avoidance, etc.) of the vehicle 100.

Accordingly, since the R-function is continuous and differentiable, the use of the R-function enables use of gradient-based trajectory optimization to generate trajectories. Using a gradient-based optimization enables direct use of vehicle model dynamics equations that provide for making the optimized trajectories dynamically feasible. Accordingly, the provided trajectory can be followed by a physical vehicle more closely than a trajectory that does not respect vehicle dynamics. Furthermore, because the determinations about each vehicle boundary point are generally independent, the separate evaluations can be performed in parallel and subsequently aggregated via EQ. (4) to improve processing efficiency within a dynamic environment of a moving vehicle. As a further benefit, the trajectory resulting from this combined analysis by the lane keeping system and the trajectory optimizer provides improved comfort (i.e., quality of ride including smooth cornering). In this way, the lane keeping system can improve the computational efficiency of generating lane keeping determinations along with improving the quality of associated trajectories for autonomous control.

Figure 4:
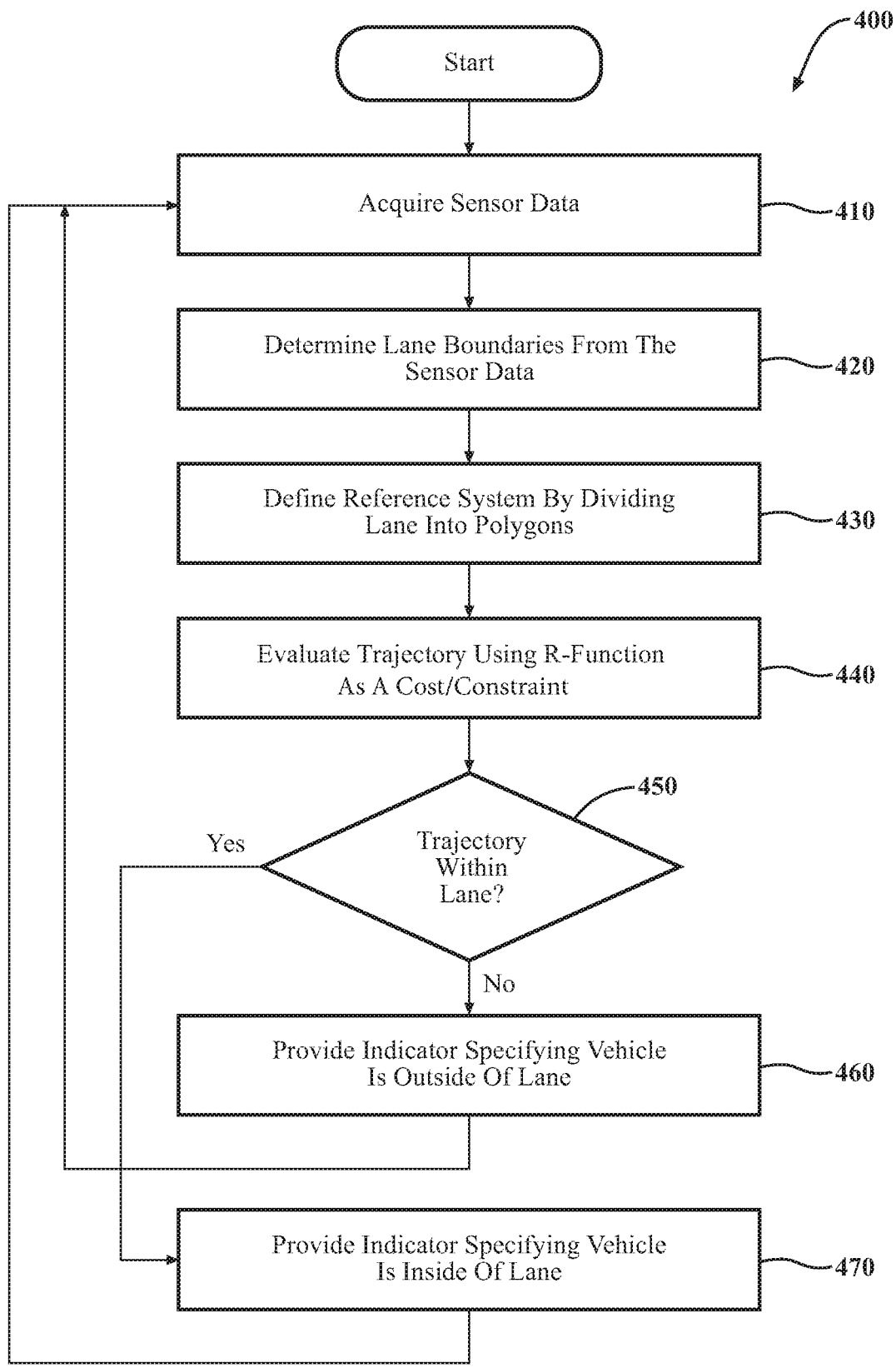
FIG. 4 illustrates one embodiment of a method that is associated with improving lane keeping in a vehicle using R-functions.

Additional aspects of lane keeping using R-functions will be discussed in relation to FIG. 4. FIG. 4 illustrates a flowchart of a method 400 that is associated with using a semi-analytic and geometric approach to making lane change determinations. Method 400 will be discussed from the perspective of the lane keeping system 170. While method 400 is discussed in combination with the lane keeping system 170, it should be appreciated that the method 400 is not limited to being implemented within the lane keeping system 170 but is instead one example of a system that may implement the method 400.

At 410, the sensor module 220 controls the sensor system 120 to acquire the sensor data 250. In one embodiment, the sensor module 220 controls the LiDAR sensor 124 and the camera 126 of the vehicle 100 to observe the surrounding environment. Alternatively, or additionally, the sensor module 220 controls the camera 126 and the radar 123 or another set of sensors to acquire the sensor data 250. As part of controlling the sensors to acquire the sensor data 250, it is generally understood that the sensors acquire the sensor data 250 of a region around the vehicle 100 with data acquired from different types of sensors generally overlapping in order to provide for a comprehensive sampling of the surrounding environment at each time step. Thus, the sensor module 220, in one embodiment, controls the sensors to acquire the sensor data 250 of the surrounding environment. Moreover, in further embodiments, the sensor module 220 controls the sensors to acquire the sensor data 250 at successive iterations or time steps. Thus, the lane keeping system 170, in one embodiment, iteratively executes the functions discussed at blocks 410-460 to acquire the sensor data 250 and provide information therefrom. Furthermore, the sensor module 220, in one embodiment, executes one or more of the noted functions in parallel for separate observations in order to maintain updated perceptions. Additionally, as previously noted, the sensor module 220, when acquiring data from multiple sensors, fuses the data together to form the sensor data 250 and to provide for improved determinations of detection, location, and so on.

At 420, the sensor module 220 determines lane boundaries according to at least the sensor data and, in one approach, the map 260. The sensor module 220 uses the sensor data 250 as a basis for identifying boundaries of a lane in which the vehicle 100 is traveling. As noted previously, the sensor module 220 may use the sensor data 250 and the map 260 and determines the lane boundaries by, for example, estimating the lane boundaries using piecewise-linear curves to contain the lane boundaries within the lane. That is, the sensor module 220 approximately represents lane boundaries using line segments that approximate curvature and other features of the lane boundaries without using actually curved segments.

At 430, the sensor module 220 defines a reference system over the lane defined by the lane boundaries. The reference system facilitates the subsequent comparisons with the vehicle boundary points to simplify the computations toward basic geometric relationships. The sensor module 220 can define the reference system using the approximate lane boundaries by, for example, dividing the lane into disjoint polygons. This process may include adding further nodes to the piecewise-linear boundaries to match relative arclengths of opposing ones of the lane boundaries, and/or triangulating an area defined between the lane boundaries. In any case, the reference system facilitates the overall computation of the lane keeping determination.

At 440, the analysis module 230 evaluates vehicle boundary points within the reference system. In at least one approach, the analysis module 230 evaluates the vehicle boundary points as a cost or a constraint in optimizing a trajectory of the vehicle 100. This determination generally employees the previously noted R-function that defines geometric relationships between the vehicle boundary points and the reference system. By way of example, the analysis module 230 determines the cost for a given trajectory by i) generating a maximal residual for separate polygons that define the reference system over the lane according to the vehicle boundary points, ii) computing a cumulative value and a gradient over the polygons using the R-function, and iii) determining separate minimums for the vehicle boundary points. The output of this evaluation is indicative of whether the trajectory is to maintain the vehicle 100 within the lane or not.

At 450, the analysis module 230 determines if the trajectory evaluated previously maintains the vehicle 100 within the lane. In one approach, the analysis module 230 defines a threshold value for the determination that is associated with maintaining the lane. The threshold may be defined as a non-negative value for the evaluation. Whichever way the analysis module 230 defines the threshold, if the threshold indicates that the vehicle will not maintain the lane, then the analysis module proceeds to provide an associated indication at 460. By contrast, if the analysis module 230 determines that the trajectory (or at least one of the trajectories) is optimal and maintains the vehicle 100 within the lane, then the analysis module provides a positive indication at 470.

At 460, the analysis module 230 provides an indicator about the trajectory being outside of the lane. That is, in one instance, when the lane keeping system 170 does not identify a single trajectory that maintains the vehicle 100 within the lane, then the analysis module 230 indicates this occurrence to other systems in order to provide for inducing one or more actions. The various actions can include an autonomous emergency maneuver (e.g., automated braking, steering, accelerating, etc.) or simply handing control over to a driver to avoid a potentially hazardous circumstance.

At 470, the analysis module 230 provides an indicator about the trajectory being inside of the lane. That is, in one instance, when the lane keeping system 170 identifies at least one trajectory that maintains the vehicle 100 within the lane, then the analysis module 230 indicates the occurrence to other systems in the vehicle. In one approach, the lane keeping system 170 may indicate an optimal one of the trajectories that, for example, maintains the vehicle 100 closest to a centerline. In further aspects, the analysis module 230 may indicate a trajectory that best balances multiple constraints while maintaining the lane. In any case, the analysis module 230 provides the indicator in order to cause the vehicle 100 to generate controls for following the noted trajectory. In this way, the lane keeping system 170 facilitates improving the computational complexity of lane keeping determinations in order to better control the vehicle 100.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component, and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100.

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124 (e.g., 4 beam LiDAR), one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes a device, or component, that enables information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the lane keeping system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the lane keeping system 170, and/or the autonomous driving module(s) 160 may control some or all of these vehicle systems 140 and, thus, may be partially or fully autonomous.

The processor(s) 110, the lane keeping system 170, and/or the autonomous driving module(s) 160 can be operatively connected to communicate with the various vehicle systems 140 and/or individual components thereof. For example, returning to FIG. 1, the processor(s) 110, the lane keeping system 170, and/or the autonomous driving module(s) 160 can be in communication to send and/or receive information from the various vehicle systems 140 to control the movement, speed, maneuvering, heading, direction, etc. of the vehicle 100. The processor(s) 110, the lane keeping system 170, and/or the autonomous driving module(s) 160 may control some or all of these vehicle systems 140.

The processor(s) 110, the lane keeping system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the lane keeping system 170, and/or the autonomous driving module(s) 160 can control the direction and/or speed of the vehicle 100. The processor(s) 110, the lane keeping system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes)

and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine a position and velocity of the vehicle 100. The autonomous driving module(s) 160 can determine the location of obstacles, obstacles, or other environmental features, including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the lane keeping system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

The flowcharts and block diagrams in the Figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A lane keeping system for lane keeping in a vehicle, comprising:
    one or more processors;
    a memory communicably coupled to the one or more processors and storing:
        a sensor module including instructions that when executed by the one or more processors cause the one or more processors to determine lane boundaries according to at least sensor data and a map,
        wherein the sensor module includes instructions to define a reference system over a lane defined by the lane boundaries; and
    an analysis module including instructions that when executed by the one or more processors cause the one or more processors to evaluate vehicle boundary points within the reference system as a cost in optimizing a trajectory of the vehicle and using an R-function that defines geometric relationships between the vehicle boundary points and the reference system, including instructions to determine the cost for the trajectory by:
        i) generating a maximal residual for separate polygons that define the reference system over the lane,
        ii) computing a cumulative value and a gradient over the polygons, and
        iii) determining separate minimums for the vehicle boundary points,
        wherein the analysis module includes instructions to provide an indicator about the trajectory to control the vehicle.

2. The lane keeping system of claim 1, wherein the analysis module includes instructions to evaluate the vehicle boundary points including instructions to evaluate multiple different trajectories for planning a movement of the vehicle over a segment of roadway out to a prediction horizon and identifying the trajectory from the multiple different trajectories as part of trajectory optimization.

3. The lane keeping system of claim 1, wherein the analysis module includes instructions to provide the indicator include instructions to determine whether the R-function specifies that the trajectory is within the lane and providing the indicator to control the vehicle according to the trajectory, and to determine whether the R-function specifies the trajectory is outside of the lane and performing one of: handing over control to a driver, and executing an emergency maneuver of the vehicle.

4. The lane keeping system of claim 1, wherein the sensor module includes instructions to determine the lane boundaries including instructions to estimate the boundaries using piecewise-linear curves to contain the lane boundaries within the lane as identified from the sensor data and the map.

5. The lane keeping system of claim 1, wherein the sensor module includes instructions to define the reference system including instructions to divide the lane defined by the lane boundaries into disjoint polygons.

6. The lane keeping system of claim 5, wherein the sensor module includes instructions to divide the lane including instructions to perform at least one of adding nodes to piecewise-linear curves to match relative arclengths of opposing ones of the lane boundaries, and triangulate an area defined between the lane boundaries.

7. The lane keeping system of claim 1, wherein the sensor module includes instructions to, responsive to acquiring sensor data about a surrounding environment of the vehicle, identify the lane boundaries by fusing at least a portion of the sensor data with mapped boundaries in the map, and
wherein the vehicle boundary points include one or more of corner points of the vehicle, wheel location points, and axle points.

8. A non-transitory computer-readable medium for lane keeping in a vehicle and comprising instructions that when executed by one or more processors cause the one or more processors to:
determine lane boundaries according to at least sensor data and a map, and to define a reference system over a lane defined by the lane boundaries;
evaluate vehicle boundary points within the reference system as a cost in optimizing a trajectory of the vehicle and using an R-function that defines geometric relationships between the vehicle boundary points and the reference system, including instructions to determine the cost for the trajectory by:
  i) generating a maximal residual for separate polygons that define the reference system over the lane,
  ii) computing a cumulative value and a gradient over the polygons, and
  iii) determining separate minimums for the vehicle boundary points; and
provide an indicator about the trajectory to control the vehicle.

9. The non-transitory computer-readable medium of claim 8, wherein the instructions to provide the indicator include instructions to determine whether the R-function specifies that the trajectory is within the lane and providing the indicator to control the vehicle according to the trajectory, and to determine whether the R-function specifies the trajectory is outside of the lane and performing one of: handing over control to a driver, and executing an emergency maneuver of the vehicle.

10. The non-transitory computer-readable medium of claim 8, wherein the instructions to determine the lane boundaries include instructions to estimate the boundaries using piecewise-linear curves to contain the lane boundaries within the lane as identified from the sensor data and the map.

11. A method of lane keeping in a vehicle, comprising:
determining lane boundaries according to at least sensor data and a map;
defining a reference system over a lane defined by the lane boundaries;
evaluating vehicle boundary points within the reference system as a cost in optimizing a trajectory of the vehicle and using an R-function that defines geometric relationships between the vehicle boundary points and the reference system, including determining the cost for the trajectory by:
  i) generating a maximal residual for separate polygons that define the reference system over the lane,
  ii) computing a cumulative value and a gradient over the polygons, and
  iii) determining separate minimums for the vehicle boundary points; and
providing an indicator about the trajectory to control the vehicle.

12. The method of claim 11, wherein providing the indicator includes determining whether the R-function specifies that the trajectory is within the lane and providing the indicator to control the vehicle according to the trajectory, and determining whether the R-function specifies the trajectory is outside of the lane and performing one of: handing over control to a driver, and executing an emergency maneuver of the vehicle.

13. The method of claim 11, wherein determining the lane boundaries includes estimating the lane boundaries using piecewise-linear curves to contain the lane boundaries within the lane as identified from the sensor data and the map.

14. The method of claim 11, wherein defining the reference system includes dividing the lane defined by the lane boundaries into disjoint polygons.

15. The method of claim 14, wherein dividing the lane includes at least one of adding nodes to piecewise-linear curves to match relative arclengths of opposing ones of the lane boundaries, and triangulating an area defined between the lane boundaries.

16. The method of claim 11, further comprising:
responsive to acquiring sensor data about a surrounding environment of the vehicle, identifying the lane boundaries by fusing at least a portion of the sensor data with mapped boundaries in the map, and
wherein the vehicle boundary points include one or more of corner points of the vehicle, wheel location points, and axle points.

17. The method of claim 11, wherein evaluating the vehicle boundary points includes evaluating multiple different trajectories for planning a movement of the vehicle over a segment of roadway out to a prediction horizon and identifying the trajectory from the multiple different trajectories as part of trajectory optimization.

* * * * *